UNITED STATES PATENT OFFICE.

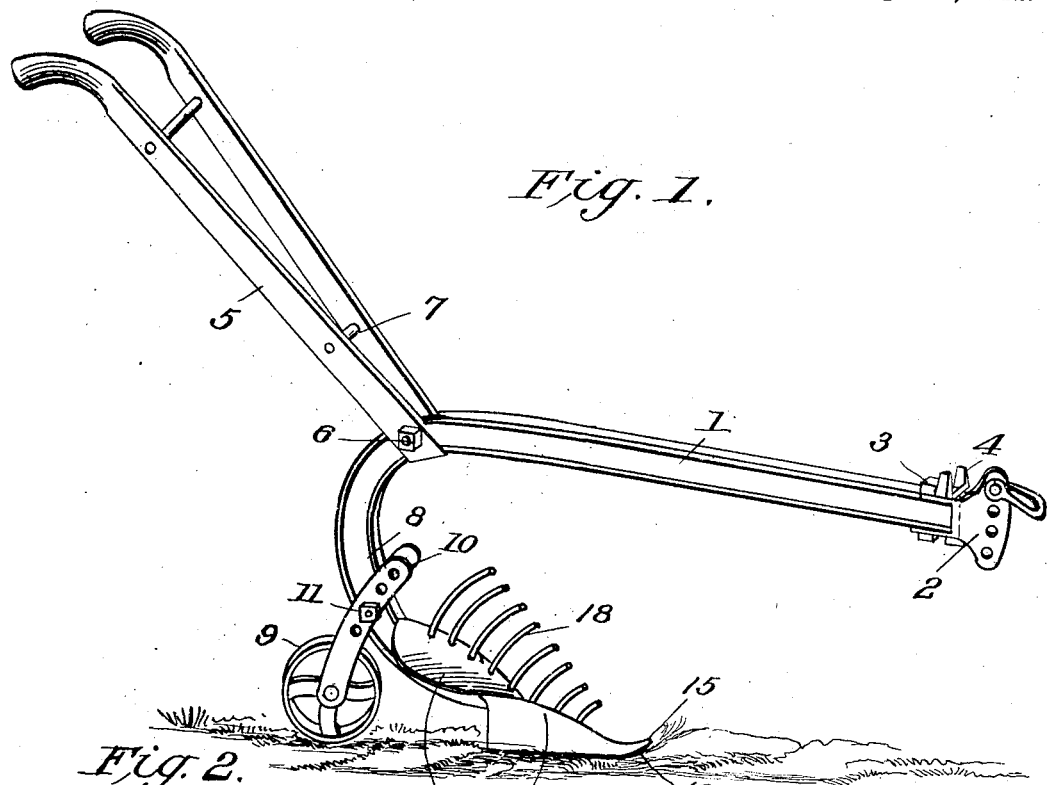
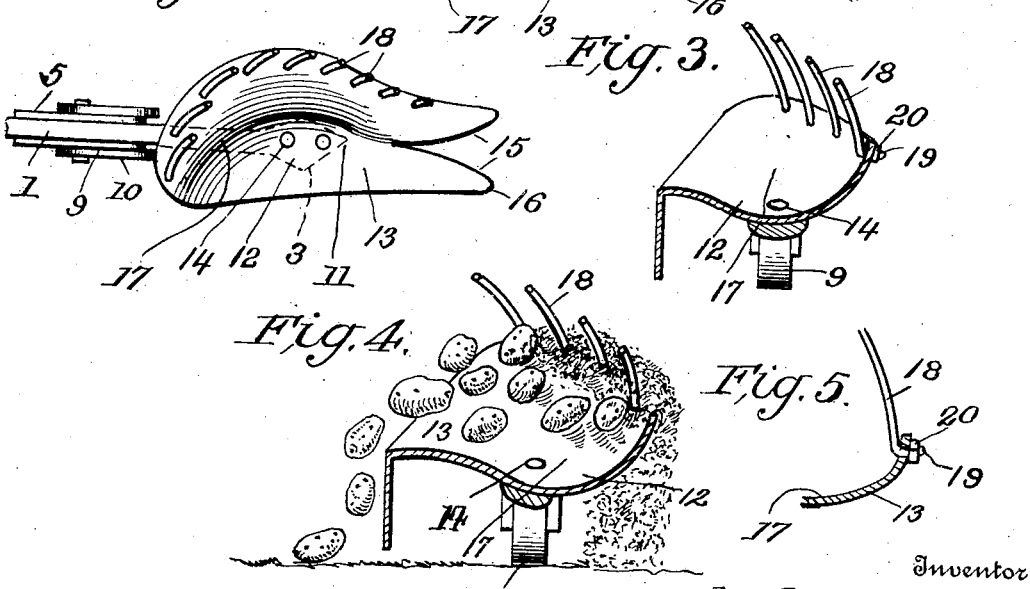

MALVIN B. PARKER, OF WATERVILLE, MAINE.

ROOT-DIGGER.

1,039,583.  Specification of Letters Patent.  Patented Sept. 24, 1912.

Application filed February 29, 1912. Serial No. 680,631.

*To all whom it may concern:*

Be it known that I, MALVIN B. PARKER, citizen of the United States, residing at Waterville, in the county of Kennebec and State of Maine, have invented certain new and useful Improvements in Root-Diggers, of which the following is a specification.

This invention has relation to root diggers, and has for its object to provide a simple and durable implement especially adapted to be used for lifting roots, potatoes, beets and the like from the soil, and having means for depositing the roots or potatoes in a row at the surface of the soil to one side of the line of draft of the implement.

With the above object in view the digger includes a curved beam preferably of metal to which handles are attached and to which a suitable clevis is applied. A gage wheel is adjustably connected to the beam and may be positioned to regulate the depth at which the implement will operate in the soil. A double pointed share is mounted upon the beam and is provided with a depression between its points along which the roots and potatoes pass as they are being forced in an upward direction out of the soil. Rods are mounted upon the share and are spaced apart so that the soil may sift between them and the said rods are so disposed that they will direct the roots and potatoes to one side of the line of draft of the implement and deposit them in a row upon the surface of the soil. And the invention has for a still further object to generally improve this class of devices and to render them more useful and commercially desirable.

For a full understanding of the invention reference is to be had to the following description and accompanying drawing, in which:

Figure 1 is a side elevation of the root digger; Fig. 2 is a top plan view of the share of the same; Fig. 3 is a transverse sectional view of the share; Fig. 4 is a sectional view of the digger, illustrating diagrammatically the manner in which the roots are cast to one side of the share, Fig. 5 is a detail sectional view of part of the share.

Corresponding and like parts are referred to in the following description and indicated in all the views of the accompanying drawing by the same reference characters.

The digger comprises a beam 1 to the forward end of which is attached a clevis 2 of any desired form, said clevis being held in position upon the beam by means of a bolt 3, and a wrench member 4 in the usual manner. Handles 5 are secured to the upper rear part of the beam 1 by means of a bolt 6 or other suitable securing device. The handles are connected together by cross rounds 7 in the usual manner.

The rear part of the beam 1 is downwardly and forwardly curved or disposed and the lower part of the beam 1 is provided with guides 8. A gage wheel 9 is journaled between the bars 10 which are adjustably mounted between the guides 8 and which may be secured in adjusted positions therein by means of a bolt 11 which is passed transversely through the bars and through the lower portion of the beam 1. A frog 12 is formed at the lower end of the beam 1. A share 13 is secured to the frog 12 by means of countersunk bolts 14. The share 13 is provided with spaced points 15 which are slightly disposed in an upward direction at their forward extremities as at 16. The intermediate portion of the share 13 is depressed in the form of a gutter 17. This gutter 17 is of the greatest depth vertically at the forward portion of the share and gradually diminishes in vertical depth toward the rear part of the share.

A series of rods 18 is mounted at one of the side edge portions of the share 13 and these rods are spaced from each other and are curved along their length so that the soil may sift between them, while the roots or potatoes that come in contact with them will be moved laterally and deposited upon the surface of the soil in a row to one side of the line of draft of the implement. Each rod 18 is provided with a shank 19 which passes through the share 13, and a nut 20 is screwed upon the lower end of each shank and serves as means for holding the rods in position upon the share.

In operation the wheel 9 and bars 10 are adjusted upon the standard so that the implement will cut at a desired distance below the surface of the soil. As the implement is drawn along a row of roots, potatoes or the like, the points 15 move at the opposite sides of the row and the roots or potatoes are received between the said points. As the roots or potatoes come in contact with the bottom of the gutter 17 they are lifted vertically together with a furrow slice of soil.

As the soil and roots come in contact with the rods the soil sifts through the spaces between the rods, while the roots are deflected or turned to one side and cast off at the ends of the rods in a row at the side of the line of draft of the implement.

As illustrated in Fig. 4 of the drawing the rods 18 are so disposed that they throw the roots to one side and at the same time they do not prevent the free passage of the soil between them, and consequently their presence upon the share does not have a tendency to any appreciable degree to increase the side draft of the digger or to cause the same to move sidewise as it is moved in a forward direction under the roots.

Having thus described the invention, what is claimed as new is:

A digger comprising a share having spaced points with a gutter extending rearwardly from between the points and terminating at one side of the share, and a series of spaced rods located at the opposite side of the share and disposed approximately over said gutter. 2

In testimony whereof I affix my signature in presence of two witnesses.

MALVIN B. PARKER. [L. S.]

Witnesses:
HARRY BELLIVEAU,
A. A. MATTHIEU.

Copies of this patent may be obtained for five cents each, by addressing the "Commissioner of Patents. Washington, D. C."